(12) United States Patent
Gupta

(10) Patent No.: US 8,839,382 B2
(45) Date of Patent: Sep. 16, 2014

(54) MOBILE NETWORK OPERATOR AND DATA SERVICE PROVIDER INTEROPERATION

(75) Inventor: Vivek Gupta, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 22 days.

(21) Appl. No.: 13/586,769

(22) Filed: Aug. 15, 2012

(65) Prior Publication Data

US 2013/0086653 A1    Apr. 4, 2013

Related U.S. Application Data

(60) Provisional application No. 61/542,726, filed on Oct. 3, 2011.

(51) Int. Cl.
*G06F 7/04* (2006.01)

(52) U.S. Cl.
USPC .......................................................... 726/5

(58) Field of Classification Search
None
See application file for complete search history.

(56) References Cited

U.S. PATENT DOCUMENTS

| | | | | |
|---|---|---|---|---|
| 2012/0030331 | A1* | 2/2012 | Karampatsis | 709/223 |
| 2012/0079082 | A1* | 3/2012 | Ding et al. | 709/220 |

OTHER PUBLICATIONS

3GPP, "Policy and charging control architecture," 3GPP TS 23.203 V11.6.0, 3rd Generation Partnership Project, Technical Specification Group Services and System Aspects, Release 11, Advanced Lte, Jun. 2012, 177 pages.
3GPP, "User Data Convergence (UDC);Technical realization and information flows," 3GPP TS 23.335 V10.0.0, 3rd Generation Partnership Project, Technical Specification Group Core Network and Terminals, Stage 2, Release 10, Advanced Lte, Mar. 2011, 3 pages.
3GPP, "General Packet Radio Service (GPRS) enhancements for Evolved Universal Terrestrial Radio Access Network ," 3GPP TS 23.401 V11.2.0, 3rd Generation Partnership Project, Technical Specification Group Services and System Aspects, (E-UTRAN) access, Release 11, Advanced Lte, Jun. 2012, 285 pages.
3GPP, "Architecture enhancements for non-3GPP accesses," 3GPP TS 23.402 V11.3.0, 3rd Generation Partnership Project, Technical Specification Group Services and System Aspects, Release 11, Advanced Lte, Jun. 2012, 218 pages.
3GPP, "EPC enhancements to Support Interworking with Data Application Providers (MOSAP)," 3GPP TR 23.862 V0.3.0, 3rd Generation Partnership Project, Technical Specification Group Services and System Aspects, Stage 2, Release 12, Advanced Lte, Jul. 2012, 20 pages.

(Continued)

*Primary Examiner* — Brandon Hoffman
(74) *Attorney, Agent, or Firm* — Schwabe, Williamson & Wyatt, P.C.

(57) ABSTRACT

Embodiments of computer-implemented methods, systems, computing devices, and computer-readable media are described herein for allowing a mobile network operator to perform services on behalf of a non-internet protocol multimedia subsystem (non-IMS) data provider. In various embodiments, an application server ("AS") front end of the data provider is communicatively connected to a user data repository ("UDR") and a home subscription server ("HSS"). The HSS is also connected to the UDR. Neither the non-IMS AS nor the HSS store user data, but instead communicate with the UDR across various reference points. The communication across the reference points facilitates the HSS performing various user services on behalf of the non-IMS AS. Other embodiments include user access and authentication procedures in such a network architecture, as well as corresponding policy and charging architecture.

26 Claims, 7 Drawing Sheets

(56) References Cited

OTHER PUBLICATIONS

3GPP, "3G security; Network Domain Security (NDS)," 3GPP TS 33.210 V12.0.0, 3rd Generation Partnership Project, Technical Specification Group Services and System Aspects, IP network layer security, Release 12, Advanced Lte, Jun. 2012, 24 pages.

3GPP, "Generic Authentication Architecture (GAA); Generic Bootstrapping Architecture (GBA)," 3GPP TS 33.220 V11.3.0, 3rd Generation Partnership Project, Technical Specification Group Services and System Aspects, Release 10, Advanced Lte, Jun. 2012, 92 pages.

3GPP, "Identity management and 3GPP security interworking; Identity management and Generic Authentication Architecture (GAA) interworking," 3GPP TR 33.924 V10.1.0, 3rd Generation Partnership Project, Technical Specification Group Services and System Aspects, Release 10, Advanced Lte, Jun. 2011, 40 pages.

* cited by examiner

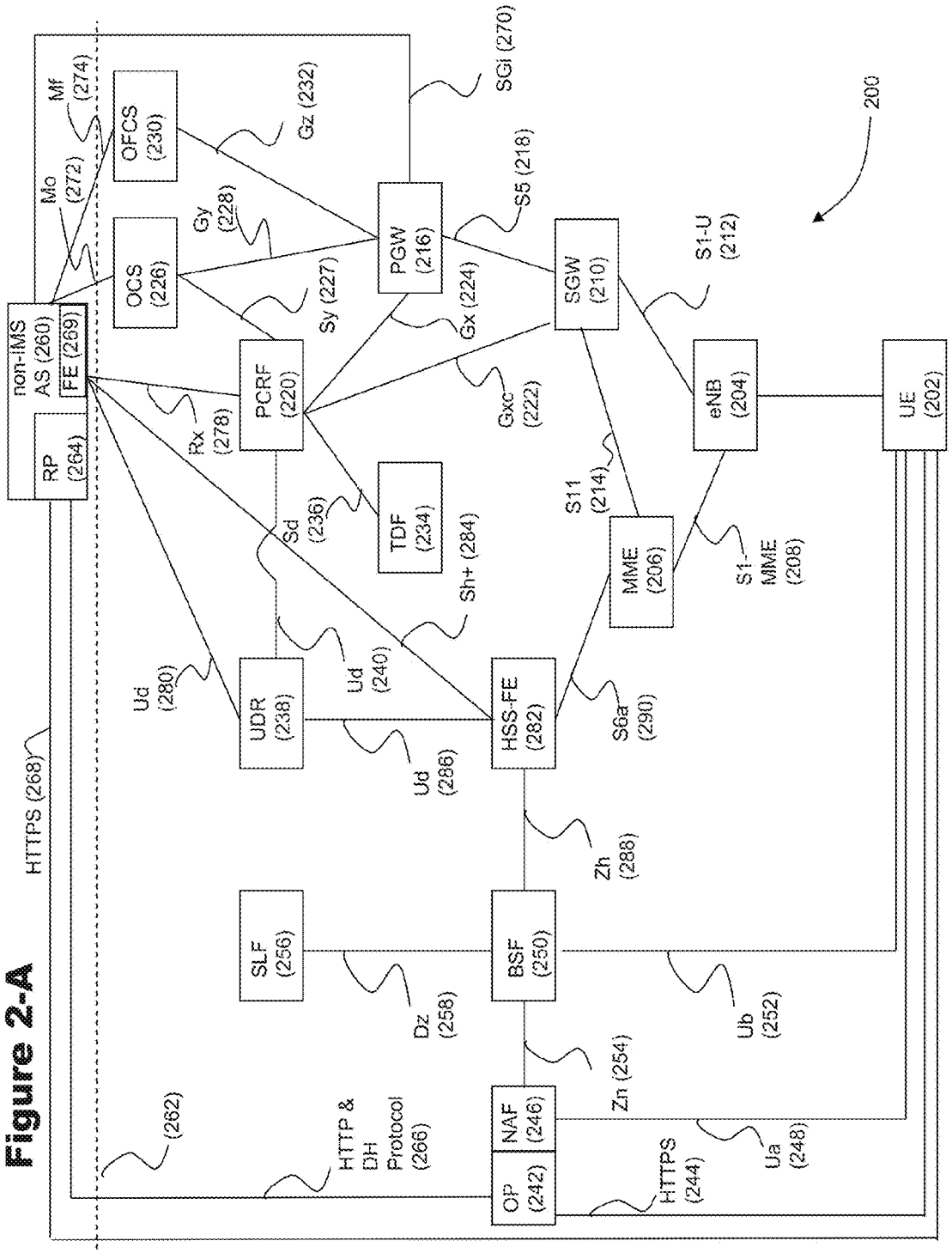
Figure 2-A

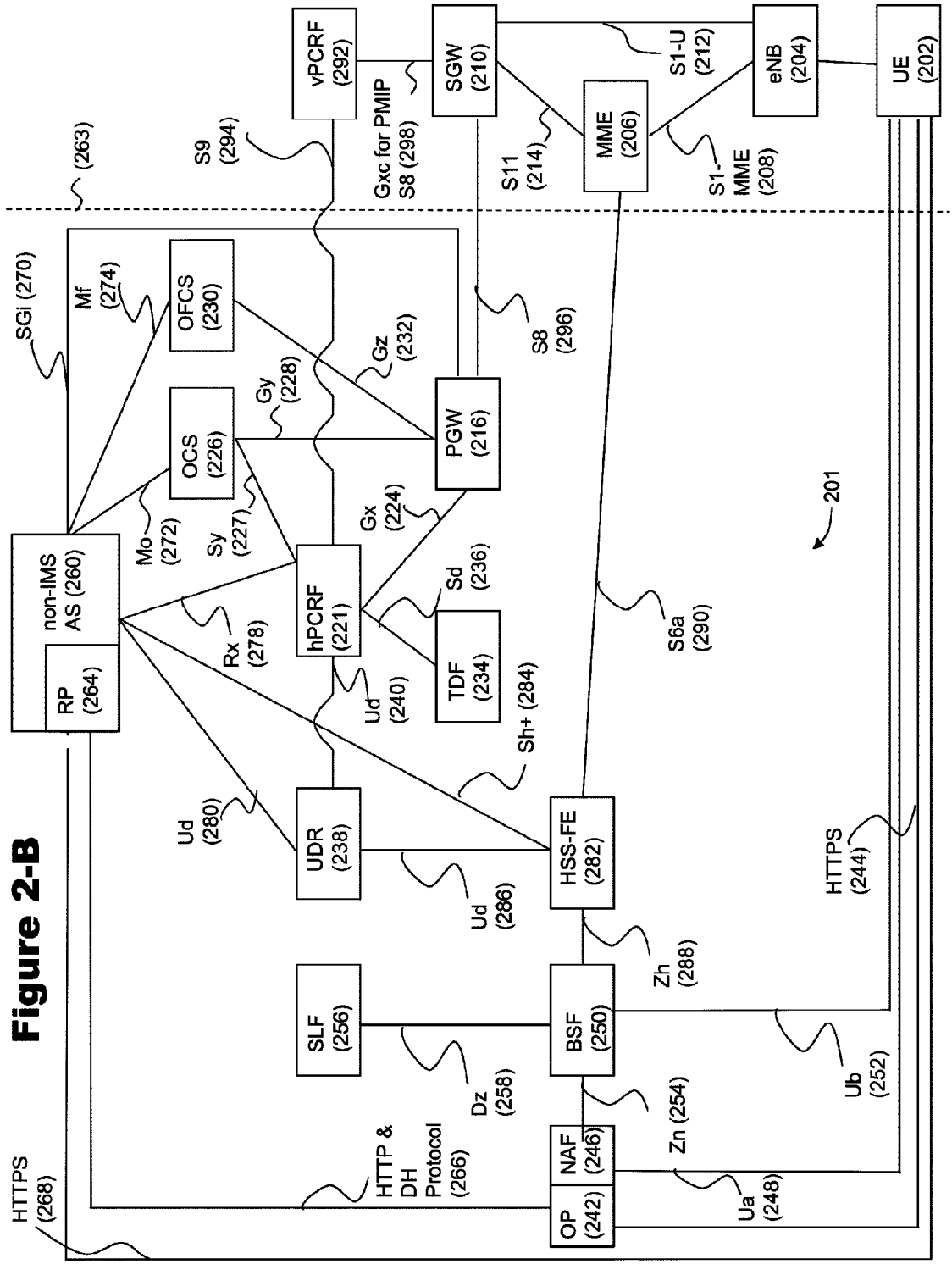
Figure 2-B

MOBILE NETWORK OPERATOR AND DATA SERVICE PROVIDER INTEROPERATION

CROSS REFERENCE TO RELATED APPLICATIONS

The present application claims priority to U.S. Provisional Patent Application No. 61/542,726, filed Oct. 3, 2011, entitled "Advanced Wireless Communication Systems and Techniques," the entire disclosure of which is hereby incorporated by reference in its entirety.

FIELD

Embodiments of the present invention relate generally to the technical field of wireless networking and, in particular, to interoperation between non-internet protocol multimedia subsystem (IMS) application servers (AS) and mobile network operators.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Mobile network operators have to deal with increasing flexibility of data services delivery on different devices. For example, data can now be delivered to an individual on a smartphone, laptop, tablet, television, or some other device. The data services could be hosted by the mobile network operators in the mobile network operators' data centers within the third generation partnership project ("3GPP") domain. Alternatively, the data services could be hosted by third party data application providers outside of the mobile network operator domain.

When the data services are hosted by third party data application providers outside of the mobile network operator domain, individual mobile network operators are required to negotiate agreements with the data service providers. The result of these individual negotiations is the creation of proprietary functionalities in third generation partnership project 3GPP networks, resulting in non-standard 3GPP interfaces. These proprietary functionalities can make it difficult for a mobile network operator to interact with multiple data service providers in an efficient manner. These difficulties are enhanced when the data service provider provides data in a (non-IMS) format.

The advent of new models of services delivery such as Cloud Computing or Applications Stores enhances the difficulties posed by multiple proprietary functionalities, because an increased number of users are attempting to access the data. The proprietary functionalities require additional programming, and can create difficulties with regard to network enhancement or backend network integration, and also restrict the mobile operator's freedom to negotiate charging models with subscribers.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 2-A schematically illustrates a detailed example of a network comprising a mobile network operator and a data service provider, in accordance with various embodiments.

FIG. 2-B schematically illustrates an alternative detailed example of a network comprising a mobile network operator and a data service provider, in accordance with various embodiments.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
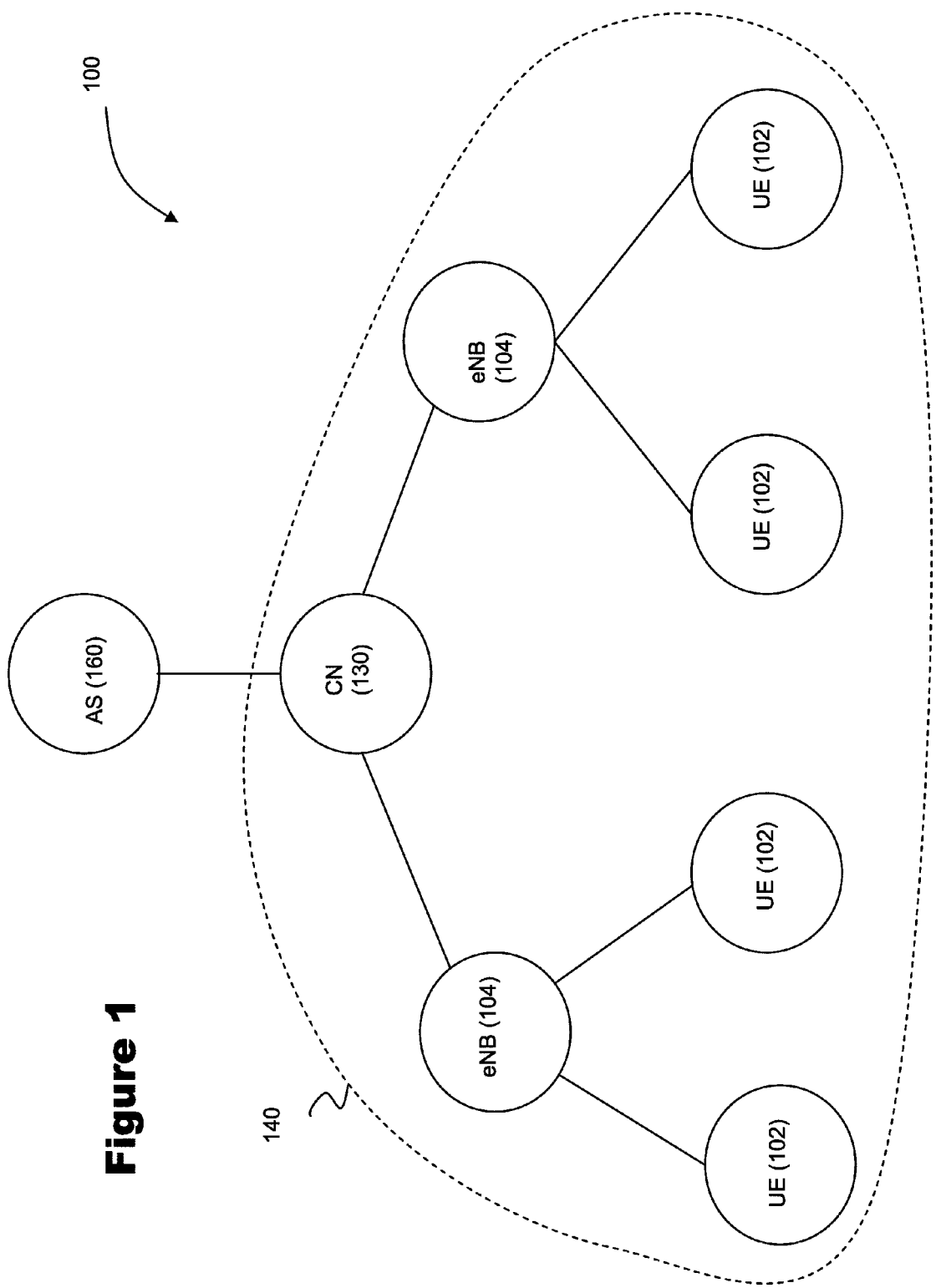
FIG. 1 schematically illustrates a high-level example of a network comprising a mobile network operator and a data service provider, in accordance with various embodiments.

FIG. 1 displays a high level overview of a network 100. User equipments ("UEs") 102 are shown connected to evolved-NodeBs ("eNBs") 104. The user equipment may be a cellular phone, a computer, a laptop, a tablet, a television, or some other form of computing device. Typically, the user equipment 102 allows a user to interact with the network in such a way that data is communicated to and from other network components either on the network 100 or a different network. The network 100 may comprise one or more UEs 102 wirelessly coupled to a single eNB 104, and the network 100 may further comprise one or more eNBs.

The eNBs 104 may be further coupled to the core network 130. The core network 130 may be comprised of a single component or multiple components. The core network 130 may be centrally located or geographically distributed. The core network 130 may provide components that perform management functions for the overall mobile network 140 that is comprised of the UEs 102, the eNBs 104 and the core network 130. Components of the core network 130 may control functions such as signal generation, signal transmission, billing, and other user services.

The mobile network 140 may be in communication with an application server ("AS") 160 of a data service provider. In some cases, the data service provider may be owned by the mobile network operator and be considered part of the mobile network 140. In other cases, the data service provider may be a third party that has a business relationship with the mobile network operator. The data service provider may provide data services to the UE 102. Examples of data services include video on demand, process server software, or machine-type communication. The mobile network 140 may be in communication with the application server 160 through a connection via the core network 130. The AS 160 may be a non-IMS AS, or an IMS AS.

FIG. 2-A shows one embodiment of a network 200 in greater detail. Unless otherwise stated, like-named elements described herein may be similar and substantially interchangeable with one another. For example, the UE 202 of FIG. 2 may be similar to, and substantially interchangeable with, the UE 102 of FIG. 1. The UE 202 may be wirelessly coupled with the eNB 204. For example, the UE 202 may be wirelessly coupled with the eNB 204 and configured to communicate with the eNB 204 in accordance with an Institute of Electrical and Electronics Engineers (IEEE) 802.11 ("WiFi") standard, a Third Generation Partnership Project ("3GPP") Long Term Evolution ("LTE") standard, a 3GPP high speed packet access ("HSPA") standard, a 3GPP wideband code division multiple access ("WCDMA") standard, a IEEE 802.16 ("WiMAX") standard, or some other wireless protocol.

The eNB 204 may be coupled to a Mobility Management Entity ("MME") 206 over an S1-MME reference point 208 that allows for control plane information to be transferred between the eNB 204 and the MME 206. Unless otherwise described, reference points and interfaces discussed herein may be similar to like-named reference points and interfaces described in 3GPP Technical Specification 23.203, 3GPP Technical Specification 23.335, 3GPP Technical Specification 23.401, 3GPP Technical Specification 23.402, 3GPP Technical Specification 33.210, 3GPP Technical Specification 33.220, or 3GPP Technical Report 33.924.

The eNB 204 may also be coupled to a serving gateway ("SGW") 210 via an S1-U reference point 212, which allows for per-bearer user plane tunneling and inter-eNB path switching during handover. The SGW 210 and MME 206 may be coupled to one another across an S11 reference point 214.

The SGW 210 may be coupled to a packet data network gateway ("PGW") 216 across an S5 reference point 218, which provides for user plane tunneling and tunnel management between the SGW and the PGW. The SGW 210 may also be coupled to a policy and charging rules function ("PCRF") 220 across a Gxc reference point 222, which allows for the communication of quality of service ("QOS") and charging data between the PCRF and the SGW.

The PGW 216 may be coupled to the PCRF 220 via a Gx reference point 224. The Gx reference point 224 allows for the PCRF 220 to control policy, charging, and application decisions of the PGW 216. The PGW may also be coupled to an online charging solution ("OCS") 226 across a Gy reference point 228 as well as an offline charging solution ("OFCS") 230 across a Gz reference point 232. The Gy 228 and Gz 232 reference points allow for the transport of service data related to online and offline charging, respectively.

The PCRF 220 may be coupled to a traffic detection function ("TDF") 234 across an Sd reference point 236 operable to transfer information related to gating, redirection or bandwidth limitation between the TDF 234 and the PCRF 220. The PCRF 220 may be further coupled to the OCS 226 across an Sy interface 227, and a user data repository ("UDR") 238 across a Ud reference point 240. The Ud reference point 240 may be configured to transmit user data between the UDR 238 and a component in communication with the UDR, for example the PCRF 220. The eNB 204, SGW 210, PGW 216, MME 206 and PCRF 220 are generally considered to be part of the evolved packet core ("EPC") of a 3GPP network.

Returning to the UE 202, the UE 202 may be coupled to both an OpenID provider ("OP") 242 across a hypertext transfer protocol secure ("HTTPS") interface 244, as well as a network application function ("NAF") 246 across a Ua reference point 248. The UE 202 may also be coupled to a bootstrapping server function ("BSF") 250 across a Ub reference point 252. The BSF 250 may, in turn, be coupled to the NAF 246 across a Zn interface 254, as well as a subscriber locator function ("SLF") 256 across a Dz reference point 258.

Together, the NAF 246, BSF 250 and SLF 256 may form a generic bootstrapping architecture ("GBA") that facilitates bootstrapping of the UE 202. Bootstrapping is a process used to authenticate the UE 202 to the network 200 so that the UE 202 can access features or services of the network 200.

The network 200 can typically also include a non-IMS AS 260 of a data service provider. The non-IMS AS 260 can either be part of a non-roaming architecture where all of the entities and components are owned by a single mobile network operator, or a non-roaming architecture where the non-IMS AS is owned by a third party. The elements above the dotted line 262 in FIG. 2 show the elements such as the non-IMS AS 260 that may be owned by the third party in some embodiments.

The non-IMS AS 260 may include a relying party ("RP") 264, which is an authenticating web application that requires proof that the end user controls an OpenID identifier. The RP 264 may be coupled to an OP 242 over a hypertext transfer protocol ("HTTP") interface. In some embodiments, the RP 264 and OP 242 may jointly establish a shared key, e.g., to secure communications, using a Diffie-Hellman ("DH") key-exchange protocol. The RP may also be coupled to the UE 202 over an HTTPS interface 268.

The non-IMS AS 260 may be coupled to, or otherwise communicate with, multiple other elements of the network 200. Specifically, the non-IMS AS 260 may be coupled to the PGW 216 across an SGi reference point 270, which is configured to communicate packet data between the PGW and the data service provider. The non-IMS AS 260 may also be coupled to both the OCS 226 across an Mo reference point 272, and the OFCS 230 across an Mf reference point 274 to enable transfer of online and offline charging information between the non-IMS AS and the OCS/OFCS, respectively. The non-IMS AS 260 may be further coupled to the PCRF 220 across an Rx reference point 278 to allow for the transfer of application level information between the non-IMS AS and the PCRF.

The non-IMS AS 260 includes a front-end 269 that is coupled to both the UDR 238 across a Ud reference point 280, and a home subscriber server front end ("HSS-FE") 282 across an Sh+ reference point 284. The HSS-FE 282 may, in turn, be coupled to the UDR 238 across the Ud reference point 286, as well as the BSF 250 across a Zh reference point 288. The HSS-FE 282 may also be coupled to the MME 206 across the S6a reference point 290. The HSS-FE and UDR may be collectively identified as user data convergence ("UDC") components.

The Sh+ interface 284 may be configured to exchange user profile information between the non-IMS AS 260 and the HSS-FE 282. In alternative embodiments the Sh+ reference point 284 may be called an Mh reference point. The user profile information can contain user location information or user state information. The user profile information can also contain one or more of repository data, IMS public identity data, an IMS user state, a serving call state control function ("S-CSCF") name, initial filter criteria, charging information, a mobile station international subscriber directory number ("MSISDN"), public service identity ("PSI") activation information, dynamic service information ("DSAI"), service level trace information, IP address secure binding information, service priority level, short message service ("SMS") registration information, UE reachability for IP, terminating access domain selection ("T-ADS") information, UE single radio voice call continuity ("SRVCC") capability, a session transfer number for SRVCC ("STN-SR") information, extended priority information, a circuit-switched domain routing number ("CSRN"), and/or reference location information.

The non-IMS AS 260 may be user-dataless, and may use the UDR 238 to store and retrieve user data via the Ud reference point 280. The non-IMS AS 260 may also be coupled to the HSS-FE 282 via the Sh+ reference point 284 to update or change data in the UDR 238 via the Ud reference point 286 between the UDR 238 and the HSS-FE 282. In some embodiments, the ability of the non-IMS AS 260 to access user data may be limited by the UDR 238, and the UDR 238 may have an access list to allow or disallow the data that the non-IMS AS is able to access or update.

As a specific example, the non-IMS AS 260 may receive a service request from a user across the HTTPS interface 268 between the UE 202 and the non-IMS AS. As previously noted, the non-IMS AS 260 may be an application server of a data provider that provides video-on-demand services, process server software services, or machine-type communication services. The non-IMS AS 260 does not store user data, but relies on user data stored in the UDR 238. The non-IMS AS 260 would then contact one or both of the HSS-FE 282 and the UDR 238 to perform a user service such as user authentication, user billing, or user charging, and provide the service to the UE 202.

If the non-IMS AS 260 contacted the HSS-FE 282 via the Sh+ reference point 284, the HSS-FE may contact the UDR 238 and temporarily store information such as user state data or user location information on the UDR 238. The HSS-FE 282 may also perform HSS specific application logic and interact with one or more components such as the MME 206 to perform the user service request and modify or update the data on the UDR 238.

FIG. 2-B shows a network that is substantially similar to the network 200 shown in FIG. 2-A. Like-named elements described herein may be similar and substantially interchangeable with one another. For example, the UE 202 of FIG. 2-A may be similar to, and substantially interchangeable with, the UE 202 of FIG. 2-B. In FIG. 2-B, the UE 202 in the network 201 is in a home-routed roaming architecture where all of the components are owned by the mobile network operator. All of the components to the right of the demarcation line 263 are in the visiting public land mobile network ("VPLMN"), or roaming network. All of the entities to the left of the demarcation line 263 are in the home public land mobile network ("HPLMN"), or home network. In another embodiment, the roaming architecture could extend to a situation where the non-IMS AS 260 is owned by a third party data service provider.

In FIG. 2-B, the PCRF 220 is replaced by a home PCRF ("hPCRF") 221. The hPCRF 221 is connected to a visiting PCRF ("vPCRF") 292 across an S9 reference point 294, which provides data transfer between the hPCRF and the vPCRF to support QoS and charging in a roaming scenario. The S5 reference point 218 between the PGW 216 and SGW 210 is replaced by the inter-PLMN S8 reference point 296. Finally, the SGW 210 is coupled to the vPCRF 292 via the Gxc for PMIP S8 reference point 298.

Figure 3:
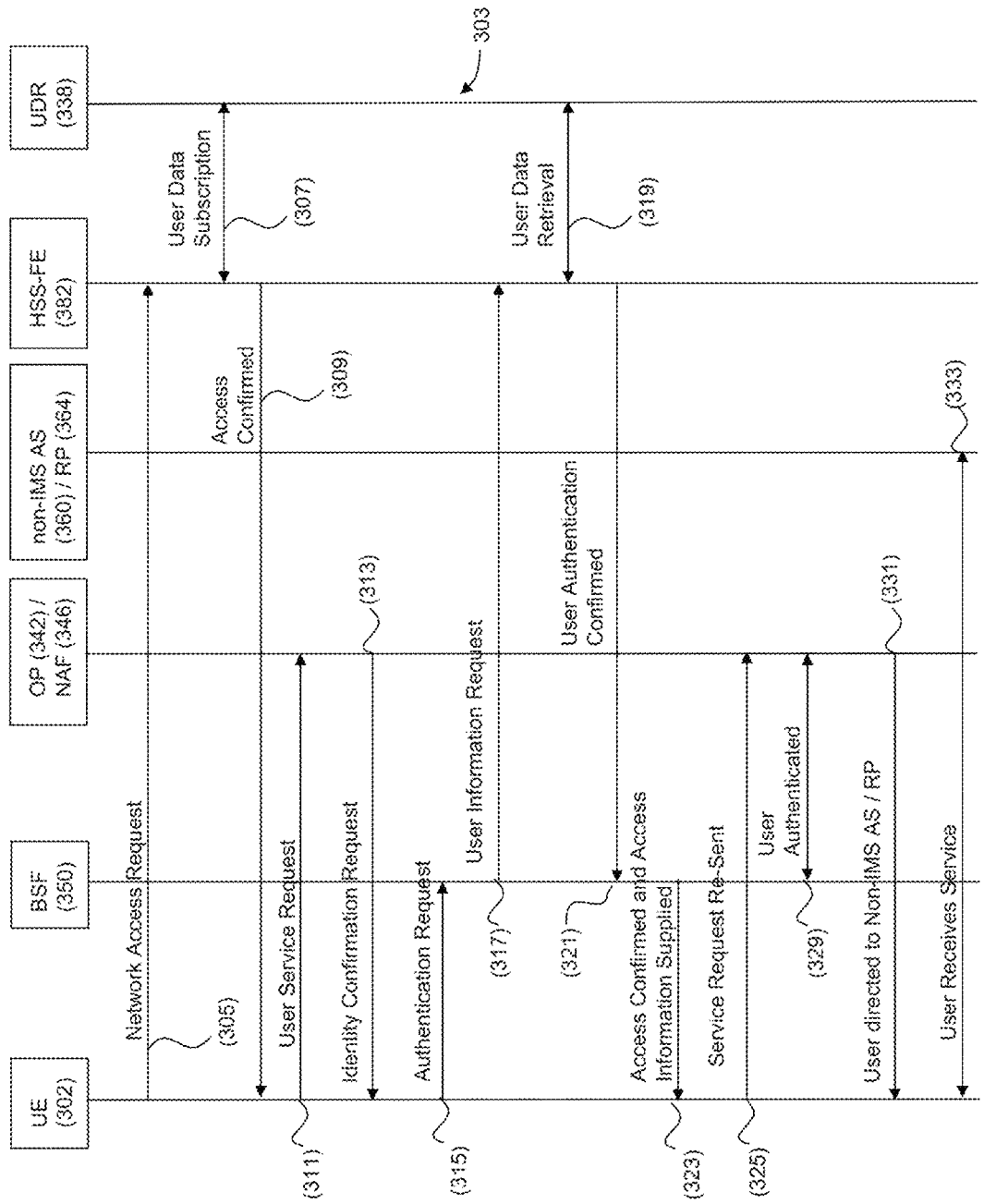
FIG. 3 depicts an exemplary user access and authentication flow, in accordance with various embodiments.

FIG. 3 shows an example of a service access and authentication scheme 303 that would be used in an embodiment of the network 200, 201. Like-named elements described herein may be similar and substantially interchangeable with one another. For example, the UE 302 of FIG. 3 may be similar to, and substantially interchangeable with, the UE 202 of FIGS. 2-A and 2-B. The access and authentication scheme generally involves communication between a UE 302, a BSF 350, the OP 342 and/or the NAF 346, the non-IMS AS 360 and/or the RP 364, the HSS-FE 382, and the UDR 338.

In an initial access phase, the UE 302 attempts to access a network, such as the network shown in FIG. 2-A or 2-B, by transmitting a network access request 305. The network access request 305 may be forwarded to the HSS-FE 382. The HSS-FE 382 may access the UDR 338 to obtain information regarding the user profile 307 in a user data subscription process 307. The user data subscription process 307 allows for the HSS-FE 382 to subscribe to notifications of changes of the user data on the UDR 338. The HSS-FE 382 may also be able to determine which processes and services the UE 302 is allowed to access based on the subscription 307. After confirming that the UE 302 can access the network, the HSS-FE 382 may send an access confirmation 309 back to the UE 302.

Next, an authentication phase occurs after the UE 302 attaches to the network. The UE 302 may attempt to access a specific data service or network function. For example, the UE 302 may attempt to access a video-on-demand service, a process server software service, a machine-type communication service, or some other type of service. To do so, the UE 302 may initially send a user service request 311 to the OP 342 and/or the NAF 346. The OP 342 and/or the NAF 346 may respond to the UE 302 with an indication that the UE 302 is to confirm its identity to the network before it can access the specific data service or function 313. The UE 302 may therefore initiate a bootstrapping function by sending an authentication request 315 to the BSF 350. The BSF 350 may identify the UE 302 that is making the request, and send the user information request as part of message 317 to the HSS-FE 382 to obtain the UE's user data. As the HSS-FE 382 may not store user data, it may poll the UDR 338 to obtain user data 319 for the UE 302. The HSS-FE 382 may obtain user data such as a user profile or an authentication vector from the UDR 338, and return as part of message 321 the obtained user data to the BSF 350 to authenticate the UE 302. The BSF 350 may then send a message 323 to the UE 302 confirming that the UE can access the given service or function, and supply the UE with access information. The access information could include, for example, a bootstrapping transaction identifier ("B-TID") or a derived key.

The UE 302 may re-send a service request 325 to the OP 342 and/or the NAF 346, and the re-sent service request may include the access information. For example, the service request could include the B-TID. The OP 342 and/or the NAF 346 may contact the BSF 350 to authenticate the user as part of message 329 using the access information. After authenticating the UE 302, the OP 342 and/or the NAF 346 may direct a message 331 to the UE. The UE 302 may then contact the non-IMS AS 360 and/or the RP 364 to receive the requested service 333.

The above discussion of the authorization and authentication process 303 is a high level overview of the process as related to the embodiments of the current disclosure. Additional or fewer steps may be desired for proper network operation.

Figure 4:
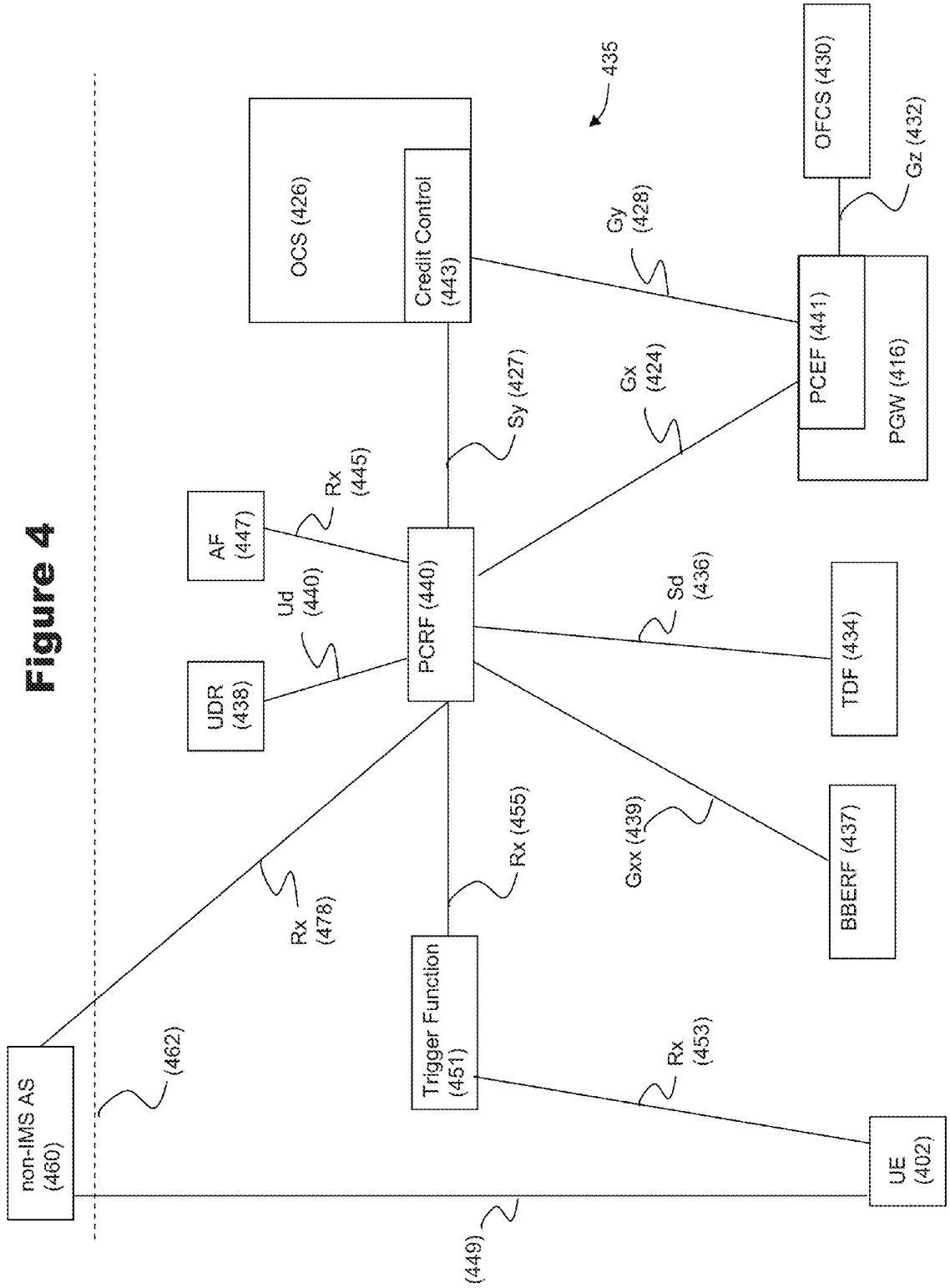
FIG. 4 schematically depicts an exemplary user policy architecture, in accordance with various embodiments.

FIG. 4 depicts an exemplary non-roaming policy architecture for a network embodiment such as network 200 and 201 where the non-IMS AS 460 is owned by a third party data service provider that has a business relationship with the mobile network operator. Like-named elements described herein may be similar and substantially interchangeable with one another. For example, the UE 402 of FIG. 4 may be similar to, and substantially interchangeable with, the UE 302 of FIG. 3. The depicted network 435 is intended to specifically show policy architecture, and so certain elements are not depicted for the sake of clarity. It will be understood that the embodiment of the network 435 may contain additional or fewer elements. Reference line 462 depicts the separation in ownership between the non-IMS AS 460 (belonging to third party data service provider) and the rest of the network.

To exemplify the policy architecture, the PCRF 440 is shown coupled to a bearer binding and event reporting function ("BBERF") across a Gxx reference point 439. The Gxx reference point 439 allows the BBERF to perform bearer binding, uplink bearer binding verification, and event reporting to the PCRF 440. Also shown is a policy and charging enforcement function ("PCEF") 441. The PCEF 441 may be a logical sub-entity of the PGW 416, however it will be understood that the PCEF may itself be located on the same or separate hardware, or be entirely separate, from the PGW. The PCEF 441 may be coupled to the PCRF 440 via the Gx reference point 424, and the OFCS 430 via the Gz reference point 432.

The PCEF 441 and the PCRF 440 may also be coupled, via respective Gy 428 and Sy 427 reference points, to a credit control logical sub-entity 443, which may be a logical sub-entity of the OCS 426. The credit control sub-entity 443 may be on the same or a separate piece of hardware as the OCS 426. The PCRF 440 may also be coupled to an application function ("AF") 447 via the Rx interface 445.

The UE 402 may communicate with the non-IMS AS 460 through application-level signaling 449. In some embodiments communication between the non-IMS AS 460 and the UE 402 may occur through an HTTPS reference point, e.g., similar to HTTPS reference point 268 shown in FIG. 2-A. The UE 402 and PCRF 440 may also be coupled to a Trigger Function 451 across respective Rx reference points 453, 455. The Trigger Function 451 may be a logical sub-entity of the PCRF 440, or may be completely separate from the PCRF. The Trigger Function 451 may also be on the same or different piece of hardware as the PCRF 440.

The Rx reference points 453, 455, 478, 445 may enable the transportation of application-level session information to and from the PCRF 440 and Trigger Function 451. The Rx reference points 453, 455, 478, 445 may be configured to transfer information such as IP filter information that identifies service data flows for policy control and/or differentiated charging, media or application bandwidth requirements for QOS control, preferential traffic handling identification, a usage threshold identifying whether the PCRF 440 reports events or traffic information to the non-IMS AS 460, and/or information identifying application or data service providers and network or system applications.

Through interaction with the Trigger Function 451, the UE 402 may request that one or more aspects of traffic handling between the UE 402 and a non-IMS AS 460 be altered. As an example, the UE 402 may, through the Trigger Function 451, request preferential traffic handling of services provided by the non-IMS AS 460. In response to the request, the PCRF 440 may trigger an internet protocol connectivity access network (IP-CAN) session modification that updates the QOS of the UE's 402 service based on information received from the Trigger Function 451. After the QOS is updated, the Trigger Function 451 can also forward confirmation of the preferential traffic handling from the UE 402 to the PCRF 440.

The Rx reference point 453 between the UE 402 and the Trigger Function 451 may enable the transportation of application-level session information based on high level protocols such as SIP, HTTP, HTTPS, or some other high level protocol across the Rx reference point 453. The Rx reference point 455 between the Trigger Function 451 and the PCRF 440 may enable the PCRF 440 to have dynamic control over the Trigger Function 451.

Figure 5:
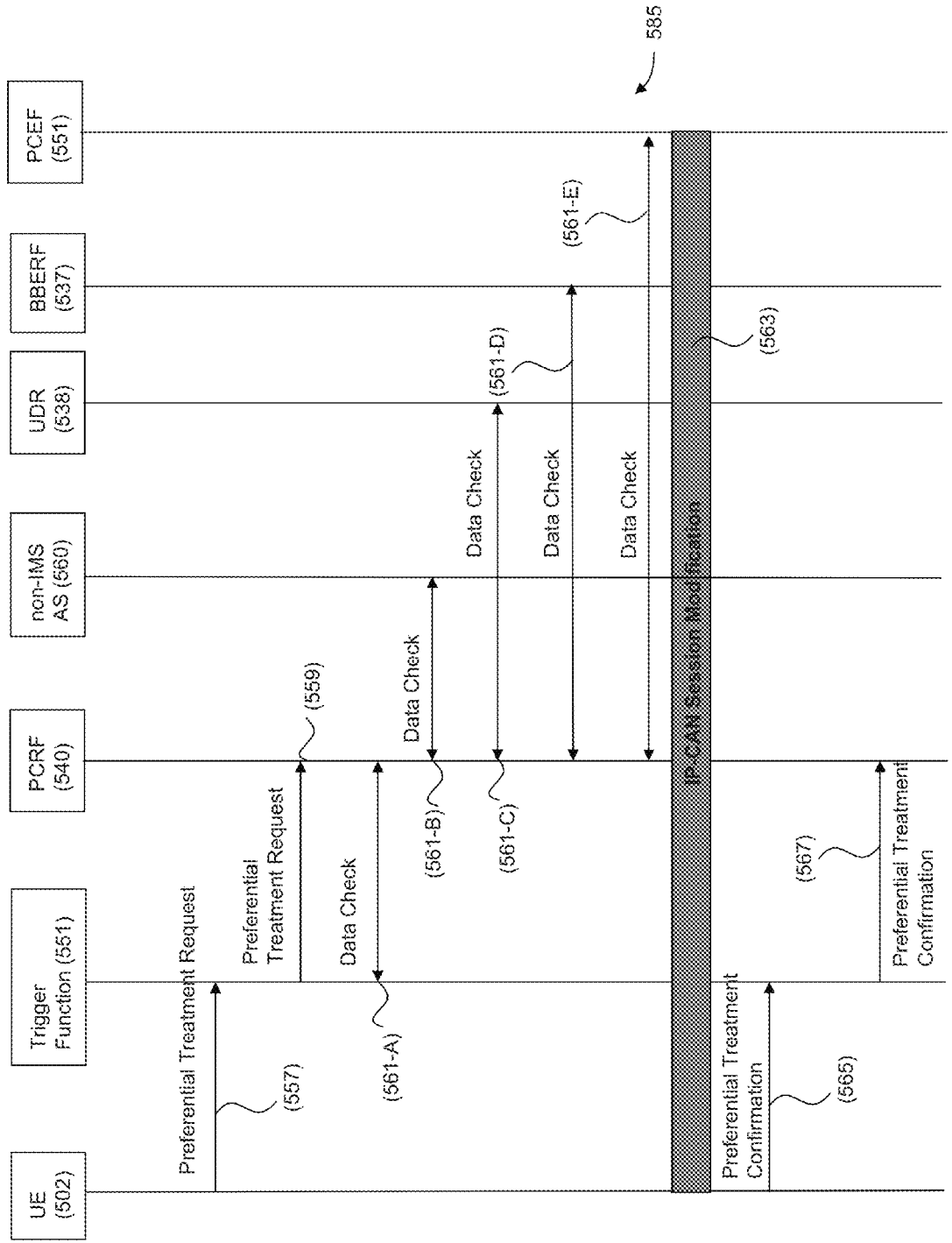
FIG. 5 depicts an exemplary user policy process flow, in accordance with various embodiments.

FIG. 5 shows an exemplary data flow 585 for the IP-CAN session modification procedure using the Trigger Function 551. Like-named elements described herein may be similar and substantially interchangeable with one another. For example, the UE 502 of FIG. 5 may be similar to, and substantially interchangeable with, the UE 402 of FIG. 4. First, the UE 502 sends a Preferential Treatment Request 557 to the Trigger Function 551. The Trigger Function 551 forwards the Preferential Treatment Request 559 to the PCRF 540.

The PCRF 540 may perform one or more data checks 561-A, 561-B, 561-C, 561-D, 561-E with the Trigger Function 551, Non-IMS AS 560, UDR 538, BBERF 537, and/or PCEF 551. For example, the PCRF 540 may retrieve information regarding the network resources being used or the current QoS from the Trigger Function 551 or the non-IMS AS 560.

In the case of the mobile network operator having a business relationship, but no service collaboration with the data application provider, the PCRF 540 can get subscription data from the non-IMS AS and the non-IMS AS list from the UDR 538 through the data check 561-C across the Ud interface 240. The PCRF 540 can also receive application service information and flow information from the non-IMS AS 560 across the Rx interface 478.

The PCRF 540 is not required to perform all of the data checks, so it is possible that only a single policy check or sub-combination of the data checks will be performed. It should be noted that the UDR 538 may also be called subscriber profile repository ("SPR") and be coupled to the PCRF 540 by an Sp interface. It should also be noted that FIG. 5 only shows one embodiment of a policy data flow, and in another embodiment one or more of the data transfers between the Trigger Function 551 and PCRF 540 may occur between the PCRF 540 and the non-IMS AS 560.

If the PCRF 540 determines that an IP-CAN session modification is allowed, the PCRF may initiate a network-wide IP-CAN session modification 563. This session modification will modify the QoS seen by the UE 502 and may provide preferential treatment to traffic between the UE 502 and other network components such as the Non-IMS AS 560. At the conclusion of the IP-CAN Session Modification 563, the UE may send a Preferential Treatment Confirmation message 565 to the Trigger Function 551, which in turn forwards the Preferential Treatment Confirmation message 567 to the PCRF 540.

Through the use of the above described embodiments, a mobile operator realizes several advantages. By making the HSS-FE and non-IMS AS user-dataless, and instead storing all user data on the UDR, the mobile operator may be able to control authentication for the third-party data applications provided by the non-IMS AS of a data provider. Additionally, the mobile operator may be able to control, authorize, and establish resources on various 3GPP accesses and reference points. Finally, the mobile operator may be able to provide policy interactions explicitly at the signaling level or via implicit mechanisms, rather than have to rely on non-standardized interactions with $3^{rd}$ party resources. These advantages greatly increase the capabilities of the interaction between UEs and $3^{rd}$-party data provider servers.

Figure 6:
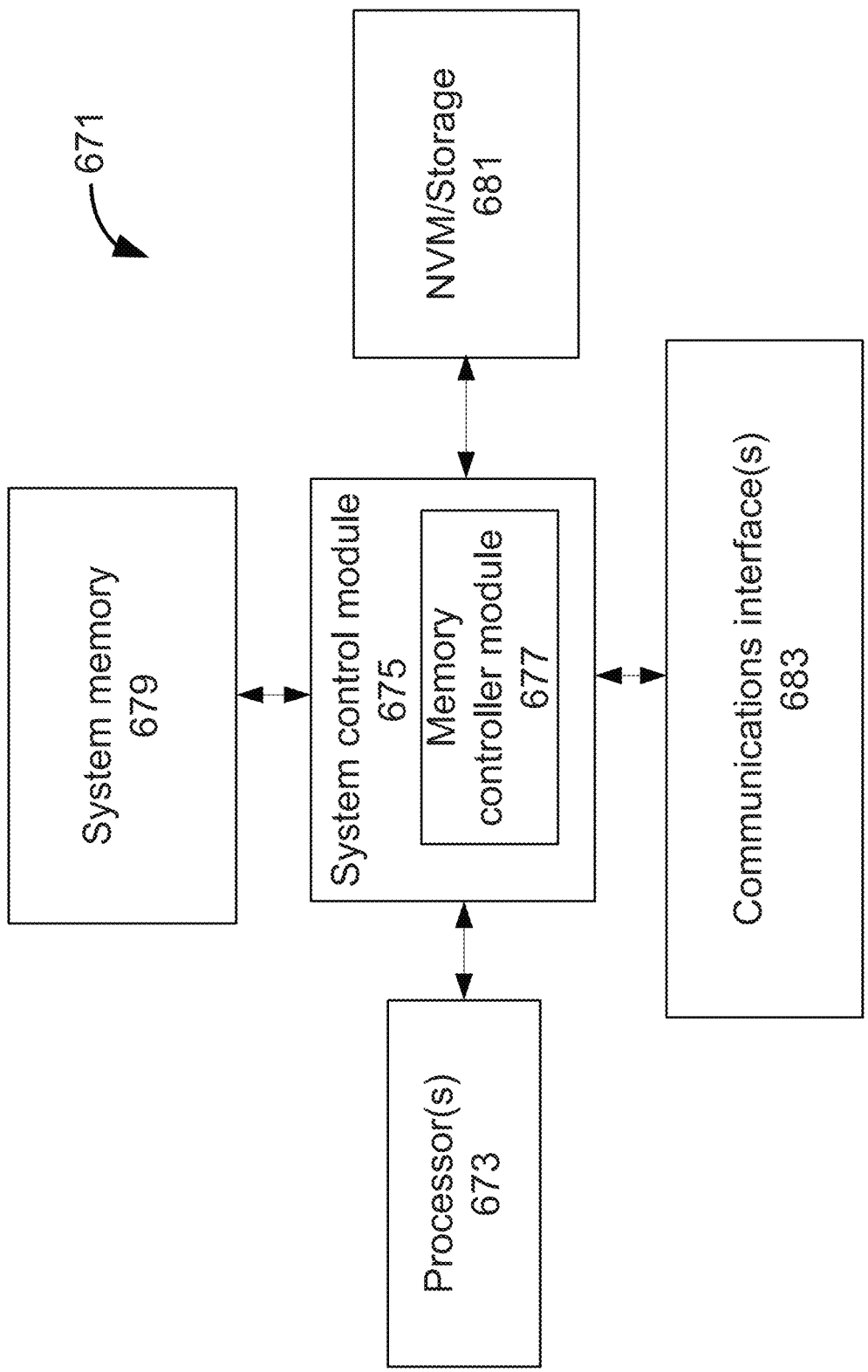
FIG. 6 schematically illustrates an example system that may be used to practice various embodiments described herein.

Embodiments of the present disclosure may be implemented into a system using any suitable hardware and/or software to configure as desired. FIG. 6 schematically illustrates an example system 671 that may be used to practice various embodiments described herein. FIG. 6 illustrates, for one embodiment, an example system 671 having one or more processor(s) 673, system control module 675 coupled to at least one of the processor(s) 673, system memory 679 coupled to system control module 675, non-volatile memory (NVM)/storage 681 coupled to system control module 675, and one or more communications interface(s) 683 coupled to system control module 675.

In some embodiments, the system 671 may be capable of functioning as the UE 202 as described herein. In other embodiments, the system 671 may be capable of functioning as the eNB 204 depicted in the embodiment shown in FIG. 2 or any one of the other described embodiments. Alternatively, the system may function as one or more nodes components of the network 200 such as the HSS-FE 282, MME 206, non-IMS AS 260, PGW 216, SGW 210 and other modules described herein. In some embodiments, the system 671 may include one or more computer-readable media (e.g., system memory or NVM/storage 681) having instructions and one or more processors (e.g., processor(s) 673) coupled with the one or more computer-readable media and configured to execute the instructions to implement a module to perform actions described herein.

System control module 675 for one embodiment may include any suitable interface controllers to provide for any suitable interface to at least one of the processor(s) 673 and/or to any suitable device or component in communication with system control module 675.

System control module 675 may include memory controller module 677 to provide an interface to system memory 679. The memory controller module 677 may be a hardware module, a software module, and/or a firmware module.

System memory 679 may be used to load and store data and/or instructions, for example, for system 671. System memory 679 for one embodiment may include any suitable volatile memory, such as suitable DRAM, for example. In some embodiments, the system memory 679 may include double data rate type four synchronous dynamic random-access memory (DDR4 SDRAM).

System control module 675 for one embodiment may include one or more input/output (I/O) controller(s) to provide an interface to NVM/storage 681 and communications interface(s) 683.

The NVM/storage 681 may be used to store data and/or instructions, for example. NVM/storage 681 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example.

The NVM/storage 681 may include a storage resource physically part of a device on which the system 673 is installed or it may be accessible by, but not necessarily a part of, the device. For example, the NVM/storage 681 may be accessed over a network via the communications interface(s) 683.

Communications interface(s) 683 may provide an interface for system 671 to communicate over one or more network(s) and/or with any other suitable device. The system 671 may wirelessly communicate with the one or more components of the wireless network in accordance with any of one or more wireless network standards and/or protocols.

For one embodiment, at least one of the processor(s) 673 may be packaged together with logic for one or more controller(s) of system control module 675, e.g., memory controller module 677. For one embodiment, at least one of the processor(s) 673 may be packaged together with logic for one or more controllers of system control module 675 to form a System in Package (SiP). For one embodiment, at least one of the processor(s) 673 may be integrated on the same die with logic for one or more controller(s) of system control module 675. For one embodiment, at least one of the processor(s) 673 may be integrated on the same die with logic for one or more controller(s) of system control module 675 to form a System on Chip (SoC).

In various embodiments, the system 671 may be, but is not limited to, a server, a workstation, a desktop computing device, or a mobile computing device (e.g., a laptop computing device, a handheld computing device, a tablet, a netbook, etc.). In various embodiments, the system 671 may have more or less components, and/or different architectures. For example, in some embodiments, the system 671 includes one or more of a camera, a keyboard, liquid crystal display (LCD) screen (including touch screen displays), non-volatile memory port, multiple antennas, graphics chip, application-specific integrated circuit (ASIC), and speakers.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A method comprising:
   receiving, from a user device, an authentication request at a home subscriber server (HSS)-front end (FE) of a mobile network, the HSS-FE configured to be user dataless;
   accessing a user data repository (UDR) of the mobile network from the HSS-FE to identify user data and subscribe to notifications regarding changes to that user data;

receiving a request at the HSS-FE for the user device to access a network application function of a non-internet protocol multimedia subsystem (IMS) data provider;

accessing the UDR of the mobile network from the HSS-FE to determine authentication information for the user device; and authenticating the user device to the non-IMS data provider based on the authentication information.

2. The method of claim 1, wherein the HSS-FE communicates with the UDR over a 3$^{rd}$ Generation Partnership Project (3GPP) Ud reference point.

3. The method of claim 1, wherein the HSS-FE communicates with a non-IMS application server (AS) of the non-IMS data provider over a 3$^{rd}$ Generation Partnership Project (3GPP) Mh reference point.

4. The method of claim 1, wherein the authentication information comprises a user profile.

5. The method of claim 1, wherein the authentication information comprises an authentication vector.

6. A non-internet protocol multimedia subsystem (IMS) application server (AS) comprising:

an application module configured to provide one or more applications of the non-IMS AS for access by a user equipment (UE); and a front end coupled with user data convergence (UDC) components of a mobile network through an interface with a home subscriber server (HSS)—front end (FE) of the UDC components, wherein the front end is configured to use the interface to exchange user profile information associated with the UE with the HSS-FE, and the HSS-FE and the non-IMS AS are configured to not store the user profile information.

7. The non-IMS AS of claim 6 wherein the interface is an Sh+ reference point or a Mh reference point.

8. The non-IMS AS of claim 6, wherein the interface is a first interface and the non-IMS AS is configured to communicate directly with a user data repository (UDR) of the UDC components over a second interface.

9. The non-IMS AS of claim 8, wherein the second interface is a Third Generation Partnership Project (3GPP) Ud reference point.

10. The non-IMS AS of claim 8, wherein the front end is configured to check or modify data in the UDR through the first interface and to store data in or retrieve data from the UDR through the second interface.

11. The non-IMS AS of claim 6, wherein the user profile information comprises user location information or user state information.

12. The non-IMS AS of claim 6, wherein the front end is further configured to transmit a user service request to the HSS-FE via the interface, the user service request relating to user authentication or user billing.

13. The non-IMS AS of claim 6, further comprising:

a video on demand server, a process server software server, or a machine-type communication server.

14. One or more non-transitory computer readable media having instructions that, when executed, cause a home subscriber server-front end (HSS-FE) to:

receive, via a first interface, a user service request from a non-internet protocol multimedia subsystem (IMS) application server (AS) of a data provider, the user service request related to user authentication, user billing, and/or user charging; and perform, via a second interface, a user service with a user data repository (UDR) based on the user service request, wherein the HSS-FE and the non-IMS AS are configured to not store user data at the HSS-FE and the non-IMS AS.

15. The one or more non-transitory computer readable media of claim 14, wherein the instructions, when executed, further cause the HSS-FE to temporarily store the user data in the UDR.

16. The one or more non-transitory computer-readable media of claim 15 wherein the user data is user state data or user location information.

17. The one or more non-transitory computer readable media of claim 14 wherein the instructions, when executed, further cause the HSS-FE to perform user billing, user charging, or user authentication on behalf of the data provider.

18. The one or more non-transitory computer readable media of claim 14, wherein the first interface is a 3$^{rd}$ Generation Parnership Project (3GPP) Mh reference point.

19. One or more non-transitory computer-readable media having instructions that, when executed, cause a trigger function to:

communicatively couple to a user equipment and to a policy and charging rules function (PCRF) such that the trigger function is logically positioned between the user equipment and the PCRF; and alter one or more aspects of traffic handling of a mobile network with respect to data provided to the user equipment from a non-internet protocol multimedia subsystem (IMS) application server (AS) of a data provider.

20. The one or more non-transitory computer-readable media of claim 19, wherein the instructions, when executed, are to further cause the trigger function to be dynamically controlled by the PCRF.

21. The one or more non-transitory computer readable media of claim 19, wherein the instructions, when executed, further cause the trigger function to interact with the PCRF across a 3$^{rd}$ Generation Partnership Project (3GPP) Rx reference point.

22. The one or more non-transitory computer-readable media of claim 21, wherein the Rx reference point is operable to transfer IP filter information, policy control information, charging information, bandwidth requirements, preferential traffic handling identification, a usage threshold, application service provider identification information, or application identification information.

23. The one or more non-transitory computer-readable media of claim 19, wherein the instructions, when executed, further cause the trigger function to interact with the user equipment using hypertext transfer protocol (HTTP).

24. The one or more non-transitory computer-readable media of claim 19, wherein the instructions, when executed, further cause the trigger function to alter the one or more aspects of the network in response to a request from the user equipment for increased quality of service (QOS).

25. The one or more non-transitory computer-readable media of claim 19, wherein the instructions, when executed, further cause the trigger function to alter the one or more aspects of traffic handling by sending a request from the user equipment to the PCRF.

26. An apparatus comprising:

the one or more non-transitory computer readable media of claim 19; and one or more processors, coupled with the one or more non-transitory computer-readable media and configured to execute the instructions.

* * * * *